United States Patent [19]

Hoogland

[11] Patent Number: 4,993,817
[45] Date of Patent: * Feb. 19, 1991

[54] ENDOSCOPE RELAY OPTICS

[76] Inventor: Jan Hoogland, 8982 N. Applegate Rd., Grants Pass, Oreg. 97527

[*] Notice: The portion of the term of this patent subsequent to Aug. 7, 2007 has been disclaimed.

[21] Appl. No.: 261,052

[22] Filed: Oct. 21, 1988

Related U.S. Application Data

[63] Continuation-in-part of Ser. No. 191,926, May 9, 1988, Pat. No. 4,946,267.

[51] Int. Cl.$^5$ .................. G02B 23/00; G02B 9/36; G02B 9/60; G02B 9/62
[52] U.S. Cl. .................................... 350/465; 350/573; 350/464; 350/463; 350/432; 350/470
[58] Field of Search ............... 350/573, 572, 465, 470, 350/432, 413, 414, 447, 475, 464, 463

[56] References Cited

U.S. PATENT DOCUMENTS 2,346,062  4/1944  Altman .
2,519,760  8/1950  Hett .
2,571,308  10/1951 Taylor .
2,899,862  8/1959  Baker .
4,025,155  5/1977  Imai .
4,168,882  9/1979  Hopkins .
4,354,730  10/1982 Bel .
4,385,810  5/1983  Hamou .
4,545,652  10/1985 Hoogland .
4,575,195  3/1986  Hoogland .
4,783,154  11/1988 Takahashi ..................... 350/413

OTHER PUBLICATIONS

Proceedings of the OSA; (Hoogland) International Lens Design Conference; SPIE vol. 237; Systematics of photographic Lens types; 1980.

Primary Examiner—Jon W. Henry
Attorney, Agent, or Firm—Townsend and Townsend

[57] ABSTRACT

An endoscope relay optics design that reduces the number of air surfaces while maintaining high levels of correction. A lens assembly for incorporation into an optical transfer system (where two such assemblies define an optical transfer module for transferring an image between successive image planes) is of unitary construction. The assembly comprises five elements including a central rod-like element of high index material, a pair of negative elements of relatively low index, high dispersion material cemented to opposite ends of the central element, and a pair of positive end elements of high index, low dispersion material cemented to the negative elements. The powers of the elements are determined by requiring the Petzval sum to assume a desired low value, with index difference being the primary contributor to the correction. The two exposed surfaces are flat or mildly concave and include an aspheric component to correct spherical aberration.

19 Claims, 6 Drawing Sheets

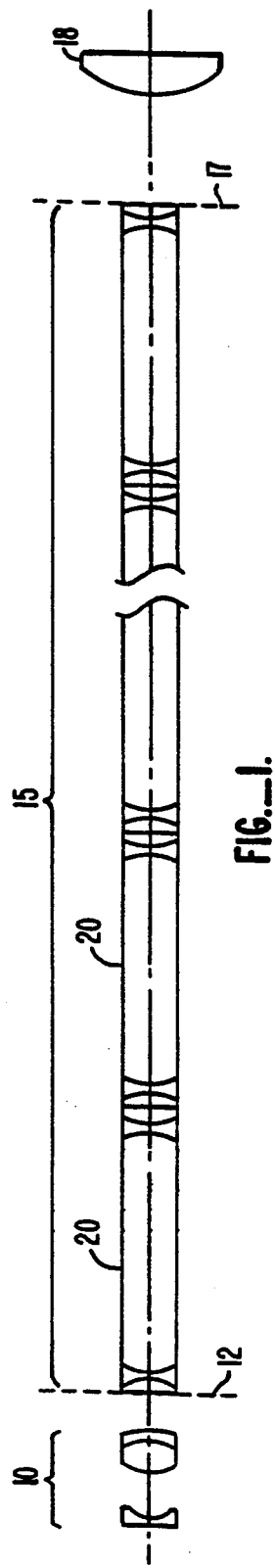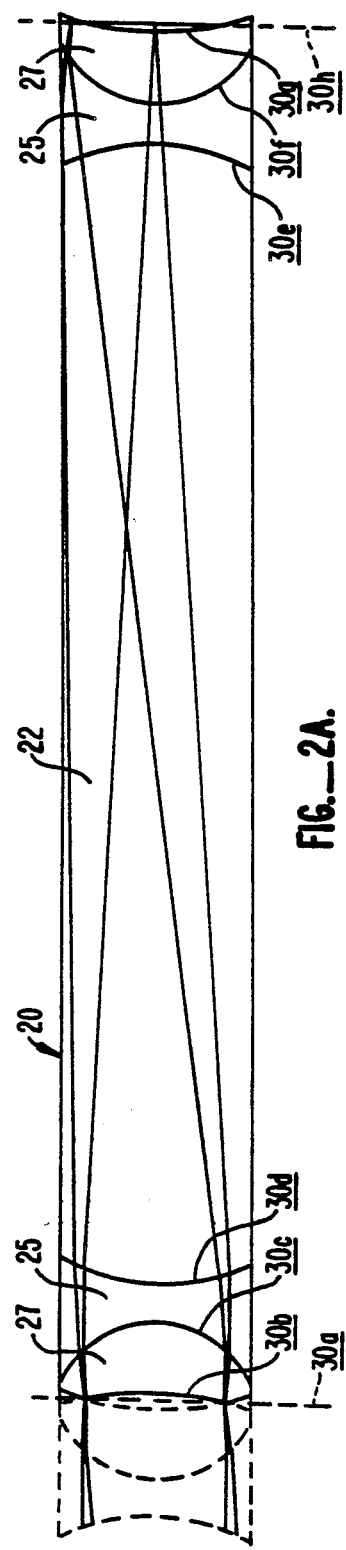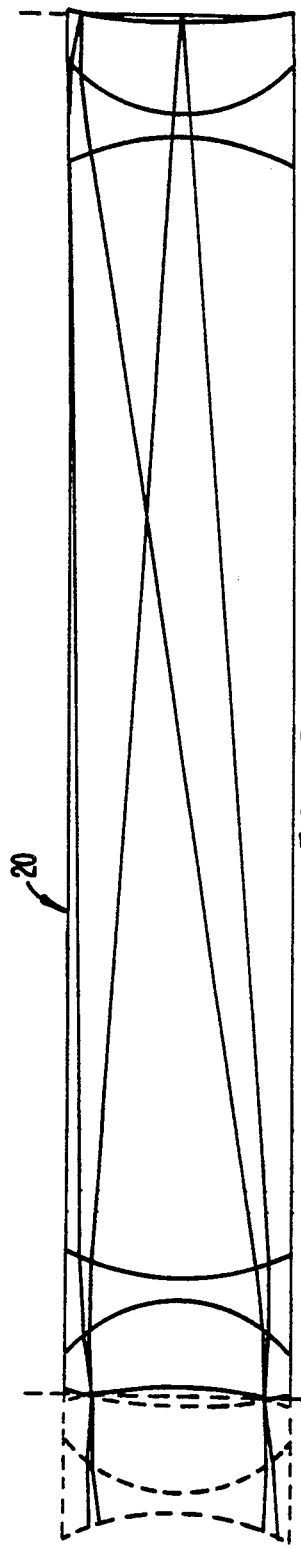

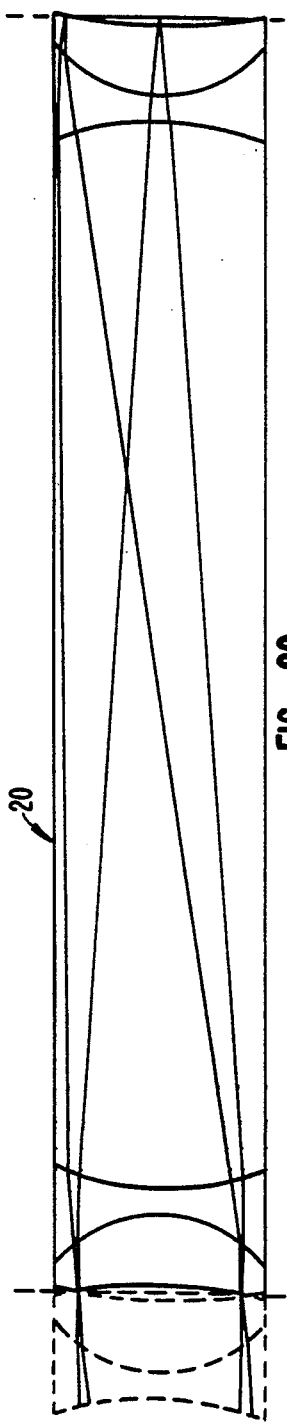
FIG._2C.
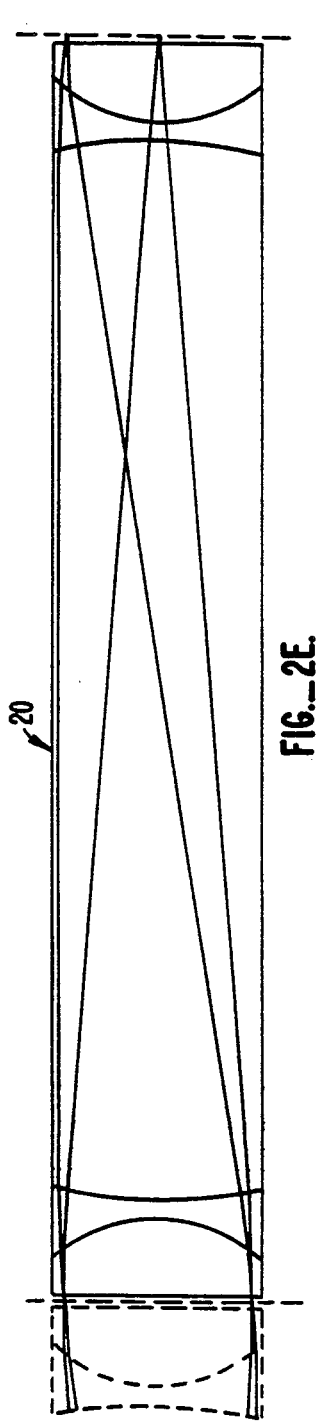
FIG._2E.
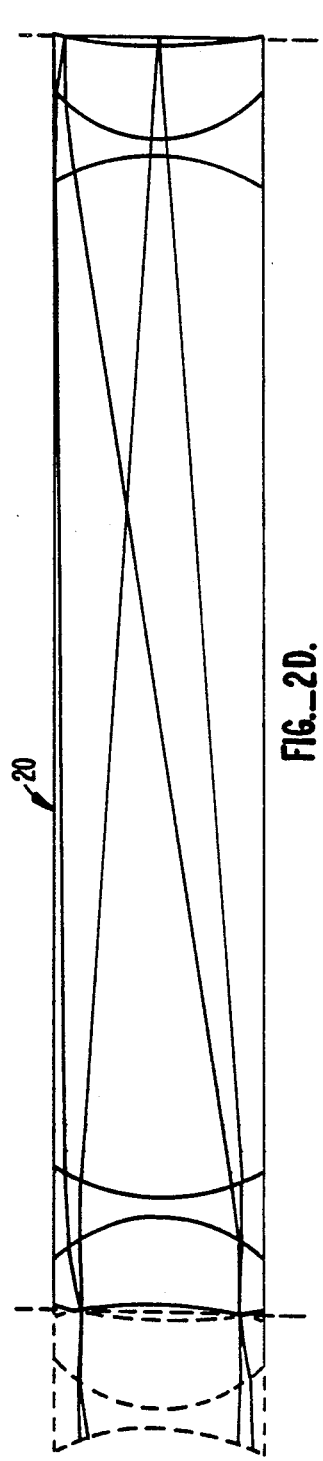
FIG._2D.

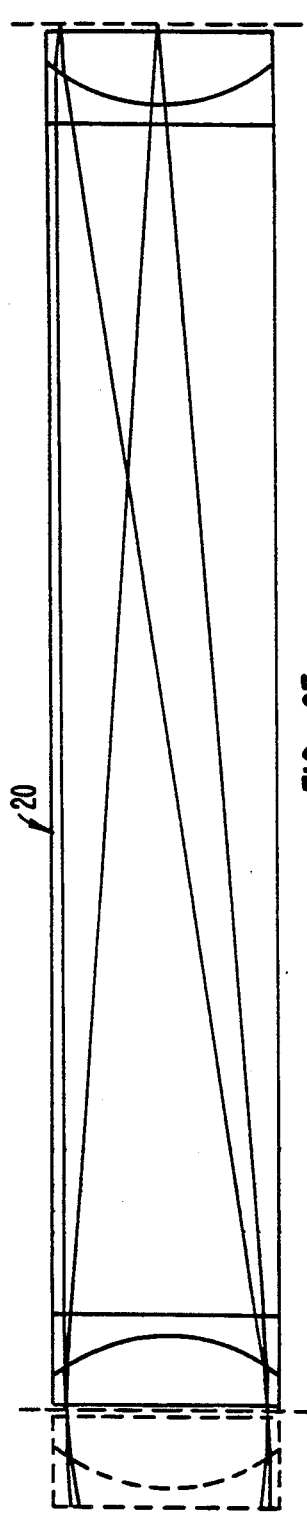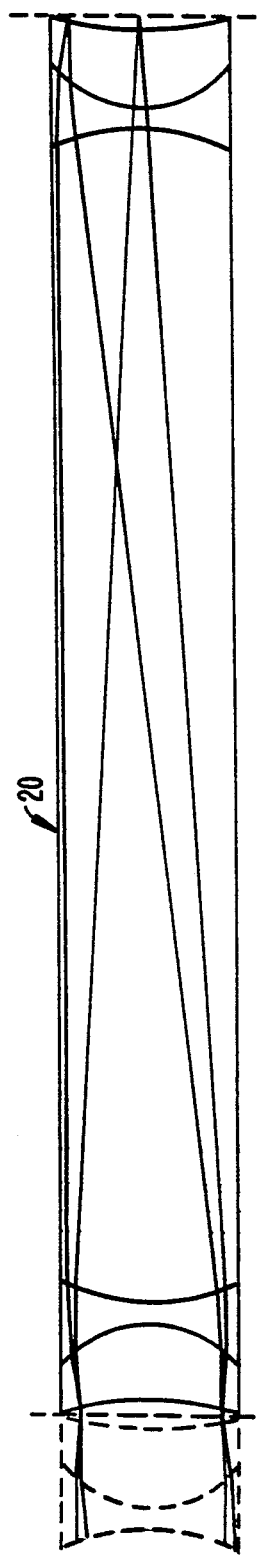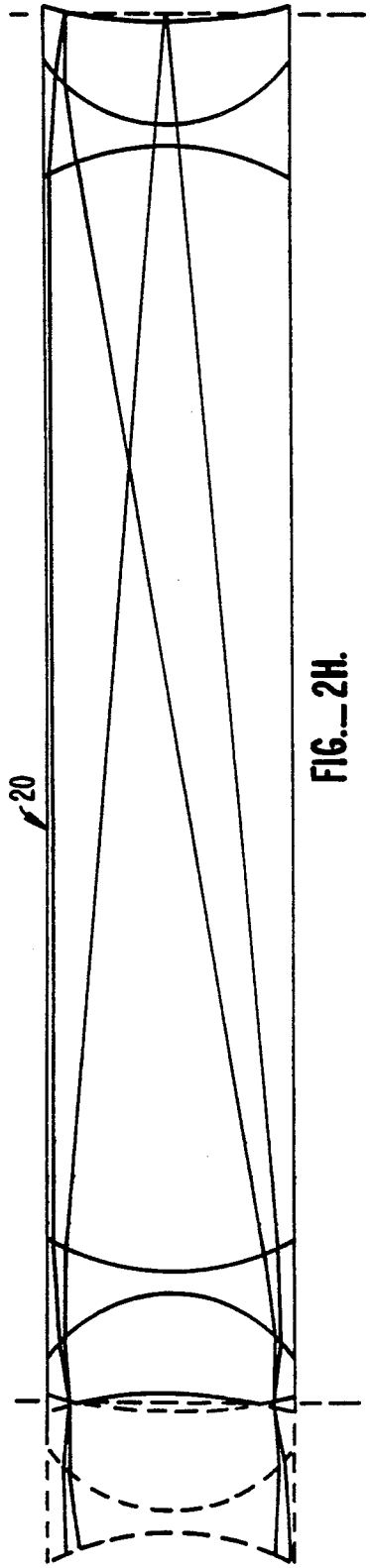
FIG._2F.  FIG._2G.  FIG._2H.

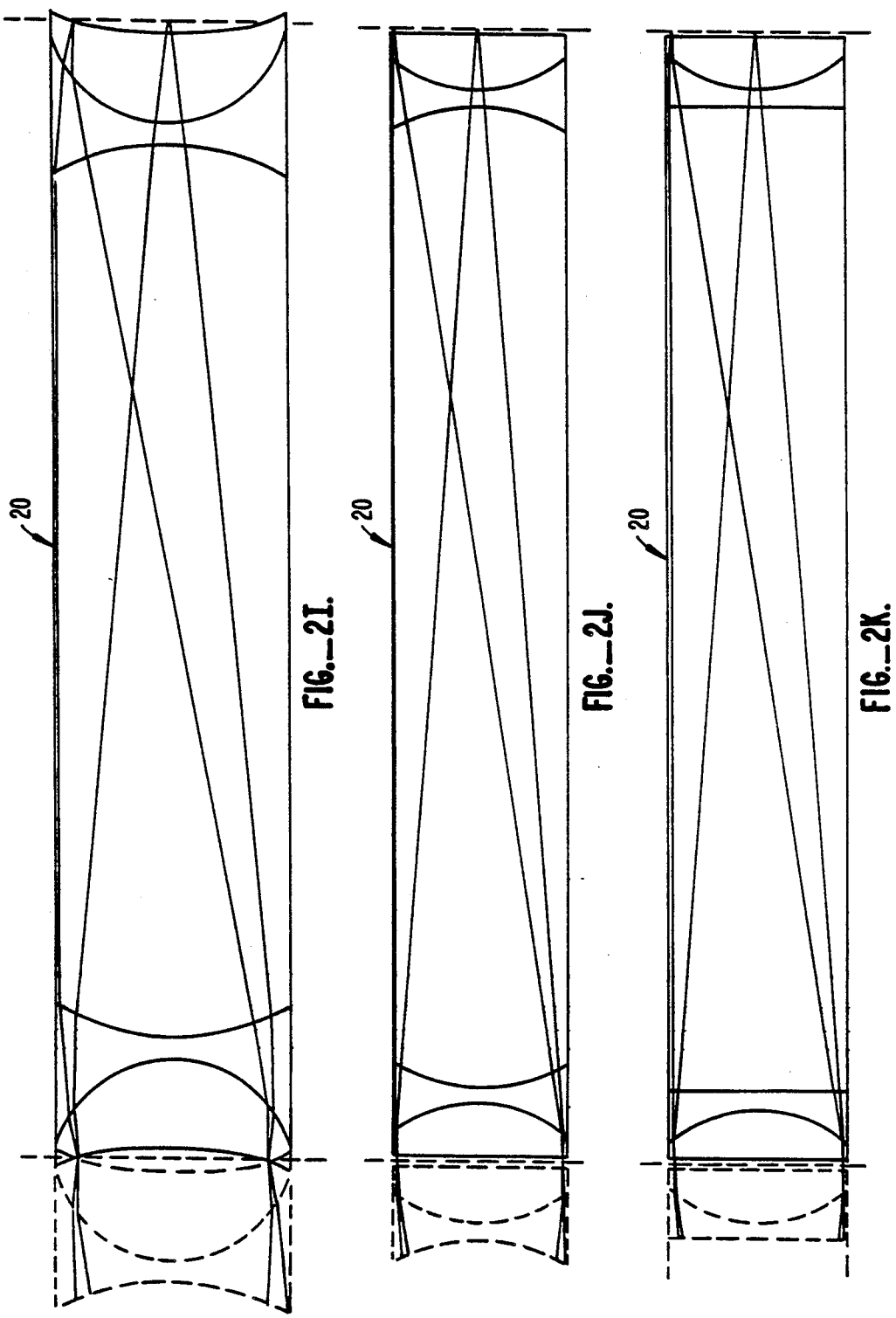

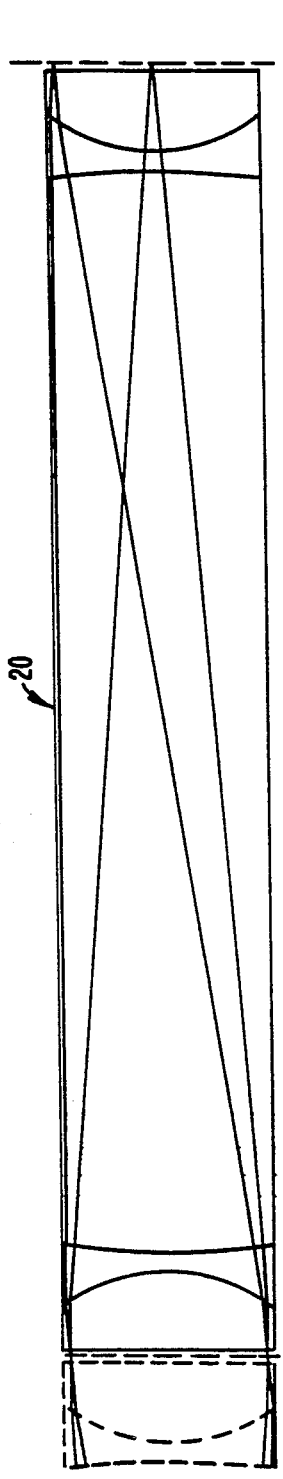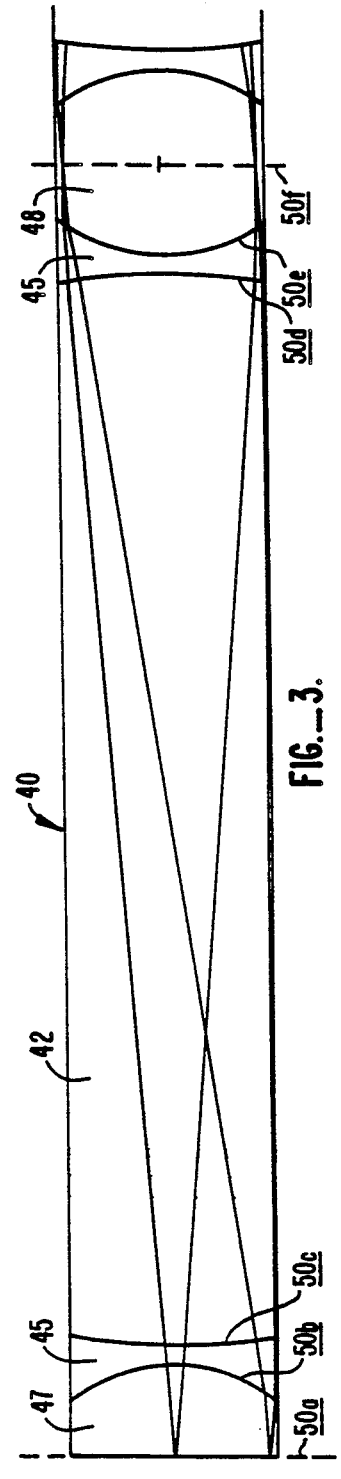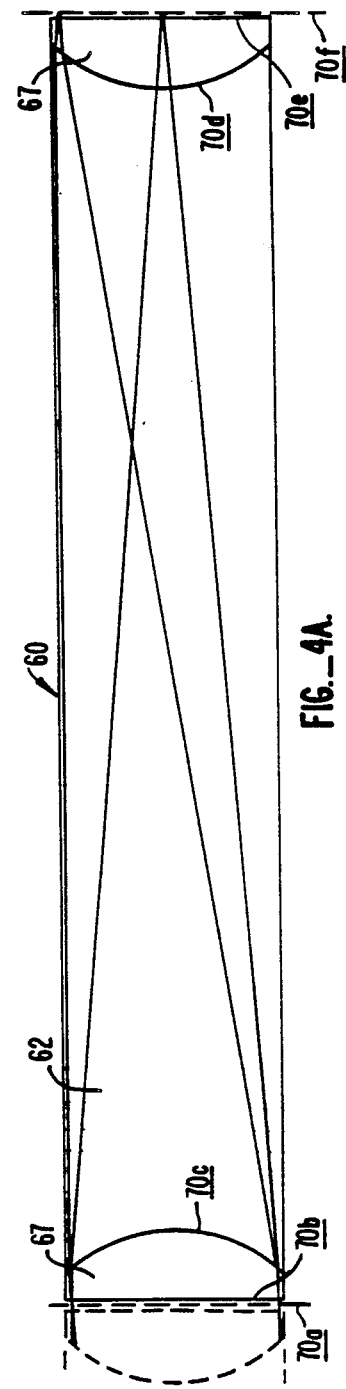
FIG.—2L.　FIG.—3.　FIG.—4A.

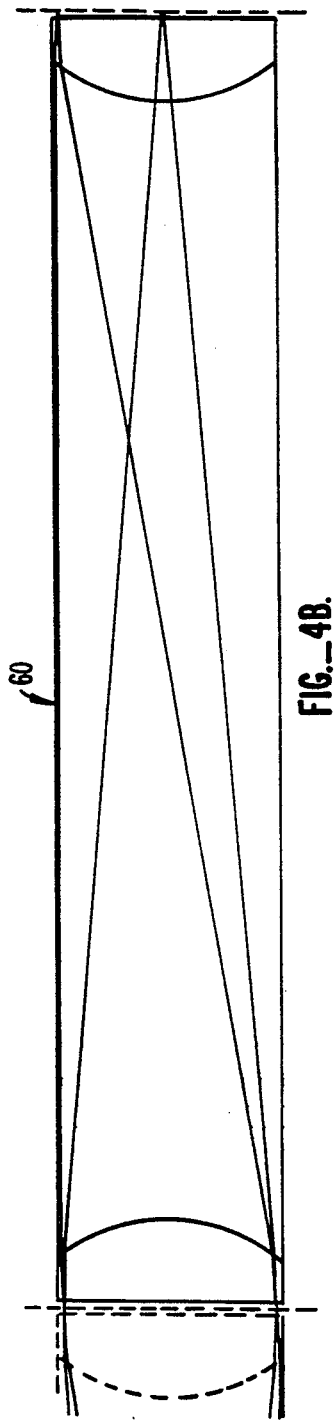
FIG._4B.
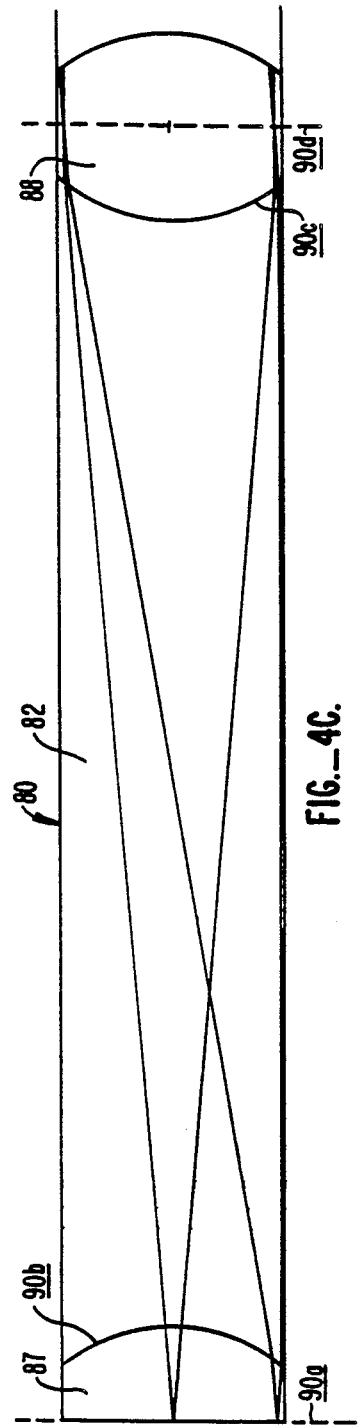
FIG._4C.
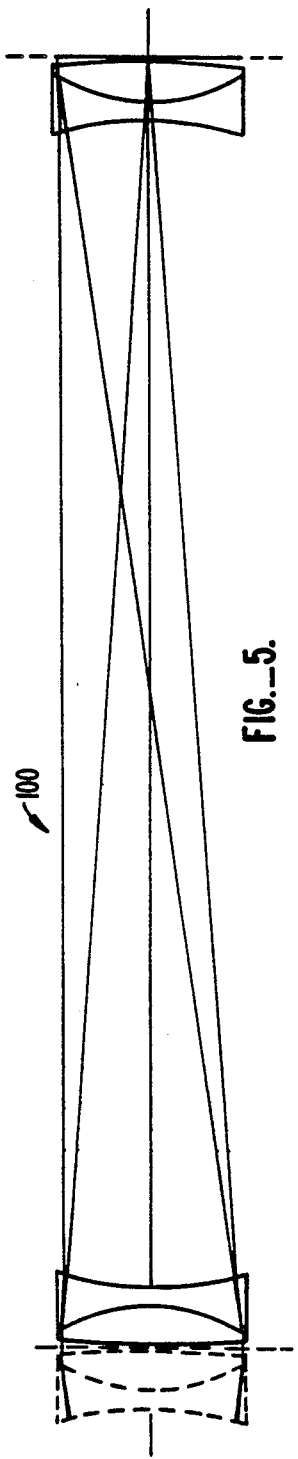
FIG._5.

ENDOSCOPE RELAY OPTICS

CROSS REFERENCE TO RELATED CASES

This application is a continuation-in-part of copending U.S. Application, Ser. No. 191,926 filed May 9, 1988 now U.S. Pat. No. 4,946,267.

FIELD OF THE INVENTION

The present invention relates generally to relay optics, and more specifically to endoscope relay optics.

BACKGROUND OF THE INVENTION

U.S. Pat. No. 4,575,195, which is hereby incorporated by reference, discloses a series of endoscope relay optics characterized by the Petzval sum being corrected to a desired degree primarily by index difference, thereby avoiding any spaced high powered elements or sharply bent elements. Spherical aberration is corrected by providing aspheric surfaces on the exposed surfaces of negative plastic elements glued to positive glass elements. The design of the lenses discussed in the patent is very flexible and allows a high degree of correction so that the image quality at the eyepiece of the endoscope is high.

However, quality usually has its price, and the price in this case is a relatively large number of glass-air and plastic-air interfaces for most of the embodiments. Thus, while the lenses themselves are readily manufacturable in the sense of having relatively gentle surfaces, the cost of coating the large number of interfaces can be considerable.

SUMMARY OF THE INVENTION

The present invention provides an endoscope relay optics design that reduces the number of air surfaces while maintaining substantially the levels of correction that characterize the prior art endoscope optics referred to above.

A lens assembly for incorporation into an optical transfer system (where two such assemblies define an optical transfer module for transferring an image between successive image planes) is of unitary construction. For one set of examples, the assembly comprises five elements including a central rod-like element of high index, low dispersion material (typically having convex or flat surfaces), a pair of negative elements of relatively low index, high dispersion material cemented to opposite ends of the central element, and a pair of positive end elements of high index, low dispersion material cemented to the negative elements. The powers of the elements are determined by requiring the Petzval sum to assume a desired low value, with index difference being the primary contribution to the correction. The lenses are of symmetric configuration to correct coma, distortion, and lateral color, and the dispersions of the material are choses to correct chromatic aberration.

In some examples, the two exposed surfaces are flat (but not abutting adjacent assemblies) or mildly curved and include an aspheric component to correct spherical aberration. In other examples, the exposed surfaces do not include aspheric components. Rather, aspherics are located along the interfaces between the positive end elements, and their abutting negative elements. In a limiting case, where the end surfaces are flat, they abut the flat end surfaces of the adjacent lens assemblies, whereupon the flat faces can be cemented, or adjacent end elements can be made unitary. In a further limiting case, the negative elements and the central element can be formed of the same material, and can thus be unitary.

The present invention thus achieves a high level of optical correction and improved manufacturability due to the absence of steep curves and the small number of air interfaces.

A further understanding of the nature and advantages of the present invention may be realized by reference to the remaining portions of the specification and the attached drawings.

BRIEF DESCRIPTION OF THE DRAWINGS

FIG. 1 is an optical schematic of an endoscope showing transfer assemblies;

FIGS. 2A-L are optical schematics of various examples of five-element transfer assemblies according to the present invention;

FIG. 3 is an optical schematic of a limiting case of the assembly of FIG. 2L;

FIGS. 4A-C are optical schematics of other limiting cases; and

FIG. 5 is an optical schematic of a paired doublet assembly.

DESCRIPTION OF THE PREFERRED EMBODIMENTS

FIG. 1 is an optical schematic of an endoscope 5 in which the relay optics of the present invention may be incorporated. The system comprises an objective 10 for forming an image in a first image plane 12, a relay system 15 for transmitting an image in plane 12 to a second image plane 17, and an eyepiece 18 for viewing the transmitted image. Objective 10 and transfer system 15 occupy a relatively small diameter barrel which is typically surrounded by an annular fiberoptics bundle. A typical diameter of the lenses is about 2.5 mm.

In use, the endoscope is inserted within a body cavity or the like by a physician for viewing of internal body regions. Objective 10 forms an image of the region to be viewed at first image plane 12, which image is transmitted by relay system 15 to second image plane 17 proximate eyepiece 18 for direct viewing by the physician or communication to a television camera. In some of the examples to be discussed below, relay system 15 comprises a plurality of cemented five-element assemblies 20. Assemblies 20 are arranged in pairs, with each pair providing a transfer module (i.e. a module which transfers an image from one plane at the front of the module to a second plane at the rear of the module). In certain limiting cases, the entire relay system can be a single cemented assembly.

FIGS. 2A-L are optical schematics of various examples of assemblies 20 illustrating the detailed design and construction thereof. A portion of a neighboring assembly is shown in phantom. Assemblies 20 are preferably identical and symmetric from end to end. Each assembly 20 includes a central rod-like element 22, first and second negative elements 25 separated by and cemented to central element 22, and first and second positive end elements 27 separated by the central and negative elements and cemented to the negative elements.

The geometric characteristics of assembly 20 are defined by an entrance pupil plane 30a, a front surface 30b, a first cemented surface 30c, a second cemented surface 30d, a third cemented surface 30e, a fourth cemented surface 30f, a rear surface 30g, and an image plane 30h. It will be appreciated that entrance pupil plane 30a and image plane 30h would properly be referred to as an image plane and an exit pupil plane for the other assembly in the module.

The geometrical and optical parameters for the examples of FIGS. 2A–L are set forth in Appendices 1A–L, and utilize the nomenclature wherein surfaces designated A–H correspond to plane 30a, surfaces 30b–g, and plane 30h. Units are in millimeters, it being understood that the actual lenses are much smaller. Although the values in the appendices provide an assembly length of about 200 mm, and a diameter of 30–35 mm, the actual lenses would be on the order of 10–15 times smaller.

For the examples of FIGS. 2A–K, each of front and rear surfaces 30b and 30g has an aspheric component. For the assembly of FIG. 2L, each of first and fourth cemented surfaces 30c and 30f has an aspheric component. The aspheric components in both instances are characterized by the conic constant k (equal to minus the square of the eccentricity) and aspheric coefficients AD, AE, AF, and AG. For a surface having a base radius R (curvature $c=1/R$) and tangent to the x-y plane at the origin, the distance z from the x-y plane of a point (x,y) on the surface is given by the following equation:

$$z = \frac{c\rho^2}{1 + (1 - c^2(k + 1)\rho^2)^{\frac{1}{2}}} + AD\rho^4 + AE\rho^6 + AF\rho^8 + AG\rho^{10}$$

where $\rho^2 = x^2 + y^2$.

Table 1 summarizes the general configuration of the elements of the assemblies of FIGS. 2A–L. The element surfaces that are formed with aspherics are denoted by asterisks.

The general method of designing five-element assembly 20 may be outlined as follows. First, with the general configuration in mind, reasonable indices of refraction are determined from a choice of suitable materials. For example, the assembly of FIG. 2A has negative elements 25 are formed of a flint glass having a relatively low index of refraction and high dispersion. End elements 27 are formed of a crown glass having low dispersion and high index. Central element 22 is preferably also formed of a crown glass having a high index and low dispersion. As the optical power of the central element is modest, this preference is not strong. The central element provides strength for the cemented assembly.

Having determined the indices of refraction, and further imposing the requirement that the assembly be symmetric, the powers of the individual elements are determined by requiring the Petzval sum to be reduced to a predetermined desired level and further requiring a given overall power. At this point, the choice of materials may be refined so that the dispersions can be chosen to correct chromatic aberration. Spherical aberration, coma, and astigmatism are not yet corrected. However, the provision of an aspheric surface on end elements 27 corrects spherical aberration, it being noted that with glass molding, it is no more difficult to provide an aspheric surface than a spherical surface. The stop location with respect to cemented surfaces 30c and 30d, together with the distribution between those surfaces is now chosen to correct astigmatism, while coma and distortion are corrected by utilizing a symmetric configuration with two identical axially aligned assemblies defining the transfer module.

The advantages of the design of assembly 20 may be seen. First, while each transfer module comprises ten elements, there are only three different elements, namely two identical central elements, four identical negative elements, and four identical end elements. Furthermore, as described above, the elements may be molded glass. Steep surfaces as are characteristic of sharply bent elements are avoided, and assembly of the overall system is simple.

The above examples also illustrate the flexibility of the design. The examples of FIGS. 2A and 2G have the lowest Petzval sum, at the expense of lower speed. Conversely, the example of FIG. 2I is considerably faster, but with a higher Petzval sum. Additionally, the examples of FIGS. 2E–F and 2J–L, which are constrained to have flat surfaces are generally slower with higher Petzval sums. The examples of FIGS. 2C and 2I illustrate the use of polycarbonate plastic rather than flint glass for the negative elements, while the example of FIG. 2D illustrates the use of very high index material for the end elements. Moreover, for the examples of FIGS. 2F and 2K, where there is no power at the surfaces of the central element, the central element can have high dispersion, thereby adding to the flexibility of the design.

FIG. 3 is an optical schematic of a transfer module 40 that represents a limiting case of the example of FIG. 2L. The lens parameters are set forth in Appendix 2. The example of FIG. 2L, like all the preceding examples with flat end faces, has the flat faces slightly spaced from the pupil and image planes. With slight modification, the flat end faces can be constrained to lie in the pupil and image planes so that adjacent end faces abut and can be cemented. Alternatively, the two abutting end elements can be formed as a unitary element. Transfer module 40 can be thought of as including a pair of assemblies, with adjacent assemblies sharing a common element. The first assembly includes a central rod-like element 42, negative elements 45, a positive plano-convex front element 47 and the front half of a convex-convex element 48. The geometry is characterized by a front surface 50a (which is also the first image surface), cemented surfaces 50b, 50c, 50d and 50e, and a pupil plane 50f which bisects convex element 48.

FIGS. 4A and 4B are optical schematics, each of an assembly 60 where the limiting case relative to the examples of FIGS. 2A–L is that the central element and the negative elements are the same material, and thus define a unitary negative rod-like element 62, to which are cemented positive end elements 67. The geometry is characterized by a pupil plane 70a, a front surface 70b (slightly concave in FIG. 4A and flat in FIG. 4B), cemented surfaces 70c and 70d, a rear surface 70e, and an image plane 70f.

FIG. 4C shows a transfer module 80 that represents the limiting case where the flat end faces coincide with the pupil and image planes so that adjacent positive elements merge into unitary elements. Assembly 80 includes a central rod-like element 82 to which are cemented a positive plano-convex front element 87 and the front half of a convex-convex element 88. The geometry is characterized by a flat front surface 80a (which is also the first image surface), cemented surfaces 80b and 80c, and a pupil plane which bisects convex element 88. The lens parameters for the assemblies of FIGS. 4A–C are set forth in Appendices 3A–C.

FIG. 5 shows a paired doublet transfer assembly 90. The optical parameters are set forth in Appendix 4.

In conclusion, it can be seen that the present invention provides design for relay optics that is characterized by high levels of correction, manufacturability, and flexibility. While the above gives a description of the preferred embodiments of the invention, various modifications, alternative constructions and equivalents may be employed without departing from the spirit of the invention. Therefore, the above description and illustrations should not be taken as limiting the scope of the invention which is defined by the appended claims.

TABLE 1

| FIG(s). | End Elements | Negative Elements | Central Element |
|---|---|---|---|
| 2A–D,2G–I | concave*-convex | concave-concave | convex |
| 2E | plano*-convex | concave-concave | convex |
| 2F | plano*-convex | plano-concave | flat |
| 2J | convex*-convex | concave-concave | convex |
| 2K | concave*-convex | plano-concave | flat |
| 2L | plano-convex* | concave*-concave | convex |

APPENDIX 1A
(PETZVAL SUM = 0.22)

| SURFACE | RADIUS | THICKNESS | MEDIUM | INDEX | ABBE NO. |
|---|---|---|---|---|---|
| A | — | | | | |
| | | 1.000 | Air | | |
| B | −63.111 | | | | |
| | | 10.602 | Schott LAF21 | 1.792 | 47.23 |
| C | −15.873 | | | | |
| | | 5.506 | Schott LF6 | 1.570 | 42.56 |
| D | 30.551 | | | | |
| | | 165.602 | Schott LAF21 | 1.792 | 47.23 |
| E | −30.551 | | | | |
| | | 5.506 | Schott LF6 | 1.570 | 42.56 |
| F | 15.873 | | | | |
| | | 10.602 | Schott LAF21 | 1.792 | 47.23 |
| G | 63.111 | | | | |
| | | 1.000 | Air | | |
| H | — | | | | |

| SURF | CONIC CONSTANT | AD | AE | AF | AG |
|---|---|---|---|---|---|
| B | 1.516E + 01 | −3.126E-06 | −5.248E-09 | −1.507E-11 | 0.000E + 00 |
| G | 1.516E + 01 | 3.126E-06 | 5.248E-09 | 1.507E-11 | 0.000E + 00 |

| BF | F/NBR | OID | T-MAG | REF OBJ HT | REF AP HT |
|---|---|---|---|---|---|
| 1.008 | 4.00 | 399.643 | −1.000 | 12.5 | 12.5 |

| WAVL NBR | 1 | 2 | 3 | 4 | 5 |
|---|---|---|---|---|---|
| WAVELENGTH | 0.5461 | 0.4800 | 0.6438 | 0.0000 | 0.0000 |
| SPECTRAL WT | 1.0000 | 1.0000 | 1.0000 | 1.0000 | 1.0000 |

APPENDIX 1B
(PETZVAL SUM = 0.71)

| SURFACE | RADIUS | THICKNESS | MEDIUM | INDEX | ABBE NO. |
|---|---|---|---|---|---|
| A | — | | | | |
| | | 1.000 | Air | | |
| B | 110.974 | | | | |
| | | 13.985 | Schott LASFN30 | 1.807 | 46.13 |
| C | −21.284 | | | | |
| | | 3.006 | Schott LF7 | 1.578 | 41.22 |
| D | 37.398 | | | | |
| | | 164.099 | Schott LAF21 | 1.792 | 47.23 |
| E | −37.398 | | | | |
| | | 3.000 | Schott LF7 | 1.578 | 41.22 |
| F | 21.284 | | | | |
| | | 13.985 | Schott LASFN30 | 1.807 | 46.13 |
| G | 110.974 | | | | |
| | | 1.000 | Air | | |
| H | — | | | | |

| SURF | CONIC CONSTANT | AD | AE | AF | AG |
|---|---|---|---|---|---|
| B | 1.849E + 01 | −3.019E-06 | −3.764E-09 | −6.490E-12 | 0.000E + 00 |
| G | 1.849E + 01 | 3.019E-06 | 3.764E-09 | 6.490E-12 | 0.000E + 00 |

| BF | F/NBR | OID | T-MAG | REF OBJ HT | REF AP HT |
|---|---|---|---|---|---|
| 1.017 | 3.33 | 400.156 | −1.000 | 15.0 | 15.0 |

| WAVL NBR | 1 | 2 | 3 | 4 | 5 |

-continued

APPENDIX 1B
(PETZVAL SUM = 0.71)

| | | | | | |
|---|---|---|---|---|---|
| WAVELENGTH | 0.5461 | 0.4800 | 0.6438 | 0.0000 | 0.0000 |
| SPECTRAL WT | 1.0000 | 1.0000 | 1.0000 | 1.0000 | 1.0000 |

APPENDIX 1C
(PETZVAL SUM = 0.80)

| SURFACE | RADIUS | THICKNESS | MEDIUM | INDEX | ABBE NO. |
|---|---|---|---|---|---|
| A | — | | | | |
| | | 1.000 | Air | | |
| B | −128.871 | | | | |
| | | 11.396 | Schott LASF3 | 1.813 | 40.36 |
| C | −21.742 | | | | |
| | | 4.000 | Polycarbonate | 1.590 | 29.62 |
| D | 46.858 | | | | |
| | | 167.394 | Schott SF57 | 1.855 | 23.64 |
| E | −46.858 | | | | |
| | | 4.000 | Polycarbonate | 1.590 | 29.62 |
| F | 21.742 | | | | |
| | | 11.396 | Schott LASF3 | 1.813 | 40.36 |
| G | 128.872 | | | | |
| | | 1.000 | Air | | |
| H | — | | | | |

| SURF | CONIC CONSTANT | AD | AE | AF | AG |
|---|---|---|---|---|---|
| B | 2.385E + 01 | −2.563E-06 | −2.859E-09 | −4.520E-12 | 0.000E + 00 |
| C | 2.385E + 01 | 2.563E-06 | 2.859E-09 | 4.520E-12 | 0.000E + 00 |

| BF | F/NBR | OID | T-MAG | REF OBJ HT | REF AP HT |
|---|---|---|---|---|---|
| 1.022 | 3.33 | 400.351 | −1.000 | 15.0 | 15.0 |

| | | | | | |
|---|---|---|---|---|---|
| WAVL NBR | 1 | 2 | 3 | 4 | 5 |
| WAVELENGTH | 0.5461 | 0.4800 | 0.6438 | 0.0000 | 0.0000 |
| SPECTRAL WT | 1.0000 | 1.0000 | 1.0000 | 1.0000 | 1.0000 |

APPENDIX 1D
(PETZVAL SUM = 0.60)

| SURFACE | RADIUS | THICKNESS | MEDIUM | INDEX | ABBE NO. |
|---|---|---|---|---|---|
| A | — | | | | |
| | | 1.000 | Air | | |
| B | −109.876 | | | | |
| | | 14.212 | Schott LASFN31 | 1.886 | 40.76 |
| C | −23.049 | | | | |
| | | 3.000 | Schott F5 | 1.607 | 37.76 |
| D | 35.968 | | | | |
| | | 163.663 | Schott LAF21 | 1.792 | 47.23 |
| E | −35.968 | | | | |
| | | 3.000 | Schott F5 | 1.607 | 37.76 |
| F | 23.049 | | | | |
| | | 14.212 | Schott LASFN31 | 1.886 | 40.76 |
| G | 109.876 | | | | |
| | | 1.000 | Air | | |
| H | — | | | | |

| SURF | CONIC CONSTANT | AD | AE | AF | AG |
|---|---|---|---|---|---|
| B | 1.868E + 01 | −2.400E-06 | −2.307E-09 | −3.133E-12 | 0.000E + 00 |
| C | 1.868E + 01 | 2.400E-06 | 2.307E-09 | 3.133E-12 | 0.000E + 00 |

| BF | F/NBR | OD | T-MAG | REF OBJ HT | REF AP HT |
|---|---|---|---|---|---|
| 1.006 | 3.33 | 400.180 | −1.000 | 15.0 | 15.0 |

| | | | | | |
|---|---|---|---|---|---|
| WAVL NBR | 1 | 2 | 3 | 4 | 5 |
| WAVELENGTH | 0.5461 | 0.4800 | 0.6438 | 0.0000 | 0.0000 |
| SPECTRAL WT | 1.0000 | 1.0000 | 1.0000 | 1.0000 | 1.0000 |

APPENDIX 1E
(PETZVAL SUM = 1.33)

| SURFACE | RADIUS | THICKNESS | MEDIUM | INDEX | ABBE NO. |
|---|---|---|---|---|---|
| A | — | | | | |

-continued

APPENDIX 1E
(PETZVAL SUM = 1.33)

| SURF | RADIUS | THICKNESS | MEDIUM | INDEX | ABBE NO. |
|---|---|---|---|---|---|
| A | — | | | | |
| | | 1.000 | Air | | |
| B | Flat | | | | |
| | | 12.327 | Schott LAFN24 | 1.761 | 47.57 |
| C | −24.819 | | | | |
| | | 3.000 | Schott LF7 | 1.578 | 41.22 |
| D | 79.030 | | | | |
| | | 166.990 | Schott LAK10 | 1.723 | 50.17 |
| E | −79.030 | | | | |
| | | 3.000 | Schott LF7 | 1.578 | 41.22 |
| F | 24.819 | | | | |
| | | 12.327 | Schott LAFN24 | 1.761 | 47.57 |
| G | Flat | | | | |
| | | 1.000 | Air | | |
| H | — | | | | |

| SURF | CONIC CONSTANT | AD | AE | AF | AG |
|---|---|---|---|---|---|
| B | 0.000E + 00 | −2.490E-06 | −2.162E-09 | −1.722E-12 | 0.000E + 00 |
| G | 0.000E + 00 | 2.490E-06 | 2.162E-09 | 1.722E-12 | 0.000E + 00 |

| BF | F/NBR | OID | T-MAG | REF OBJ HT | REF AP HT |
|---|---|---|---|---|---|
| 1.0448 | 3.33 | 399.3333 | −1.000 | 15.0 | 15.0 |

| WAVL NBR | 1 | 2 | 3 | 4 | 5 |
|---|---|---|---|---|---|
| WAVELENGTH | 0.5461 | 0.4800 | 0.6438 | 0.0000 | 0.0000 |
| SPECTRAL WT | 1.0000 | 1.0000 | 1.0000 | 1.0000 | 1.0000 |

APPENDIX 1F
(PETZVAL SUM = 1.34)

| SURFACE | RADIUS | THICKNESS | MEDIUM | INDEX | ABBE NO. |
|---|---|---|---|---|---|
| A | — | | | | |
| | | 1.000 | Air | | |
| B | Flat | | | | |
| | | 10.188 | Schott LASFN30 | 1.807 | 46.13 |
| C | −27.271 | | | | |
| | | 3.000 | Schott TIF3 | 1.551 | 41.89 |
| D | Flat | | | | |
| | | 172.759 | Schott SF6 | 1.813 | 25.24 |
| E | Flat | | | | |
| | | 3.000 | Schott TIF3 | 1.551 | 41.89 |
| F | 27.271 | | | | |
| | | 10.188 | Schott LASFN30 | 1.807 | 46.13 |
| G | Flat | | | | |
| | | 1.000 | Air | | |
| H | — | | | | |

| SURF | CONIC CONSTANT | AD | AE | AF | AG |
|---|---|---|---|---|---|
| B | 0.000E + 00 | −2.693E-06 | −1.757E-09 | −9.843E-13 | 0.000E + 00 |
| G | 0.000E + 00 | 2.693E-06 | 1.757E-09 | 9.843E-13 | 0.000E + 00 |

| BF | F/NBR | OID | T-MAG | REF OBJ HT | REF AP HT |
|---|---|---|---|---|---|
| 1.0588 | 3.33 | 402.3318 | −1.000 | 15.0 | 15.0 |

| WAVL NBR | 1 | 2 | 3 | 4 | 5 |
|---|---|---|---|---|---|
| WAVELENGTH | 0.5461 | 0.4800 | 0.6438 | 0.0000 | 0.0000 |
| SPECTRAL WT | 1.0000 | 1.0000 | 1.0000 | 1.0000 | 1.0000 |

APPENDIX 1G
(PETZVAL SUM = 0.23)

| SURFACE | RADIUS | THICKNESS | MEDIUM | INDEX | ABBE NO. |
|---|---|---|---|---|---|
| A | — | | | | |
| | | 2.000 | Air | | |
| B | −65.414 | | | | |
| | | 11.211 | Schott LAF21 | 1.792 | 47.23 |
| C | −15.949 | | | | |
| | | 3.000 | Schott LF7 | 1.578 | 41.22 |
| D | 28.884 | | | | |
| | | 167.568 | Schott LAF25 | 1.789 | 41.04 |
| E | −28.884 | | | | |
| | | 3.000 | Schott LF7 | 1.579 | 41.22 |
| F | 15.949 | | | | |
| | | 11.211 | Schott LAF21 | 1.792 | 47.23 |

-continued

APPENDIX 1G
(PETZVAL SUM = 0.23)

| | | | | | |
|---|---|---|---|---|---|
| G | 65.414 | | | | |
| | | 2.000 | Air | | |
| H | — | | | | |

| SURF | CONIC CONSTANT | AD | AE | AF | AG |
|---|---|---|---|---|---|
| B | 1.687E + 01 | −2.983E-06 | −4.188E-09 | −7.958E-12 | 0.000E + 00 |
| G | 1.687E + 01 | 2.982E-06 | 4.188E-09 | 7.958E-12 | 0.000E + 00 |

| BF | F/NBR | OID | T-MAG | REF OBJ HT | REF AP HT |
|---|---|---|---|---|---|
| 2.003 | 4.00 | 400 | −1.000 | 10.2 | 10.2 |

| WAVL NBR | 1 | 2 | 3 | 4 | 5 |
|---|---|---|---|---|---|
| WAVELENGTH | 0.5461 | 0.4800 | 0.6438 | 0.0000 | 0.0000 |
| SPECTRAL WT | 1.0000 | 1.0000 | 1.0000 | 1.0000 | 1.0000 |

APPENDIX 1H
(PETZVAL SUM = 0.23)

| SURFACE | RADIUS | THICKNESS | MEDIUM | INDEX | ABBE NO. |
|---|---|---|---|---|---|
| A | — | | | | |
| | | 1.000 | Air | | |
| B | −117.681 | | | | |
| | | 14.879 | Schott LASFN30 | 1.807 | 46.13 |
| C | −22.026 | | | | |
| | | 3.000 | Schott LF7 | 1.578 | 41.22 |
| D | 37.521 | | | | |
| | | 162.605 | Schott LAF21 | 1.792 | 47.23 |
| E | −37.521 | | | | |
| | | 3.000 | Schott LF7 | 1.578 | 41.22 |
| F | 22.026 | | | | |
| | | 14.879 | Schott LASFN30 | 1.807 | |
| G | 117.681 | | | | |
| | | 1.000 | Air | | |
| H | — | | | | |

| SURF | CONIC CONSTANT | AD | AE | AF | AG |
|---|---|---|---|---|---|
| B | 2.453E + 01 | −2.427E-06 | −2.820E-09 | −4.759E-12 | 0.000E + 00 |
| G | 2.453E + 01 | 2.427E-06 | 2.820E-09 | 4.759E-12 | 0.000E + 00 |

| BF | F/NBR | OID | T-MAG | REF OBJ HT | REF AP HT |
|---|---|---|---|---|---|
| 1.000 | 2.78 | 400 | −1.000 | 15.05 | 15.05 |

| WAVL NBR | 1 | 2 | 3 | 4 | 5 |
|---|---|---|---|---|---|
| WAVELENGTH | 0.5461 | 0.4800 | 0.6438 | 0.0000 | 0.0000 |
| SPECTRAL WT | 1.0000 | 1.0000 | 1.0000 | 1.0000 | 1.0000 |

APPENDIX 1I
(PETZVAL SUM = 0.77)

| SURFACE | RADIUS | THICKNESS | MEDIUM | INDEX | ABBE NO. |
|---|---|---|---|---|---|
| A | — | | | | |
| | | 2.000 | Air | | |
| B | −125.497 | | | | |
| | | 15.740 | Schott LASF3 | 1.813 | 40.36 |
| C | −22.623 | | | | |
| | | 4.000 | Polycarbonate | 1.590 | 29.62 |
| D | 43.034 | | | | |
| | | 157.900 | Schott SF57 | 1.855 | 23.64 |
| E | −43.034 | | | | |
| | | 4.000 | Polycarbonate | 1.590 | 29.62 |
| F | 22.623 | | | | |
| | | 15.740 | Schott LASF3 | 1.813 | 40.36 |
| G | 125.497 | | | | |
| | | 2.000 | Air | | |
| H | — | | | | |

| SURF | CONIC CONSTANT | AD | AE | AF | AG |
|---|---|---|---|---|---|
| B | 3.323E + 01 | −1.722E-06 | −1.307E-09 | −1.208E-12 | 0.000E + 00 |
| G | 3.323E + 01 | 2.722E-06 | 1.307E-09 | 1.208E-12 | 0.000E + 00 |

| BF | F/NBR | OID | T-MAG | REF OBJ HT | REF AP HT |
|---|---|---|---|---|---|

-continued

APPENDIX 1I
(PETZVAL SUM = 0.77)

| | | | | | |
|---|---|---|---|---|---|
| 2.000 | 2.27 | 400 | −1.000 | 17.3 | 17.3 |

| WAVL NBR | 1 | 2 | 3 | 4 | 5 |
|---|---|---|---|---|---|
| WAVELENGTH | 0.5461 | 0.4800 | 0.6438 | 0.0000 | 0.0000 |
| SPECTRAL WT | 1.0000 | 1.0000 | 1.0000 | 1.0000 | 1.0000 |

APPENDIX 1J
(PETZVAL SUM = 1.22)

| SURFACE | RADIUS | THICKNESS | MEDIUM | INDEX | ABBE NO. |
|---|---|---|---|---|---|
| A | — | | | | |
| | | 1.000 | Air | | |
| B | 885.300 | | | | |
| | | 9.615 | Schott LAFN24 | 1.761 | 47.57 |
| C | −25.732 | | | | |
| | | 3.000 | Schott LLF1 | 1.551 | 45.47 |
| D | 31.395 | | | | |
| | | 173.016 | Schott BK7 | 1.519 | 63.96 |
| E | −31.395 | | | | |
| | | 3.000 | Schott LLF1 | 1.551 | 45.47 |
| F | 25.732 | | | | |
| | | 9.615 | Schott LAFN24 | 1.761 | 47.57 |
| G | −885.300 | | | | |
| | | 1.000 | Air | | |
| H | — | | | | |

| SURF | CONIC CONSTANT | AD | AE | AF | AG |
|---|---|---|---|---|---|
| B | 0.000E + 00 | −2.648E − 06 | −2.041E − 09 | −1.831E − 12 | 0.000E + 00 |
| G | 0.000E + 00 | 2.648E − 06 | 2.041E − 09 | 1.831E − 12 | 0.000E + 00 |

| BF | F/NBR | OID | T-MAG | REF OBJ HT | REF AP HT |
|---|---|---|---|---|---|
| 1.000 | 4.00 | 400 | −1.000 | 15.2 | 15.2 |

| WAVL NBR | 1 | 2 | 3 | 4 | 5 |
|---|---|---|---|---|---|
| WAVELENGTH | 0.5461 | 0.4800 | 0.6438 | 0.0000 | 0.0000 |
| SPECTRAL WT | 1.0000 | 1.0000 | 1.0000 | 1.0000 | 1.0000 |

APPENDIX 1K
(PETZVAL SUM = 1.29)

| SURFACE | RADIUS | THICKNESS | MEDIUM | INDEX | ABBE NO. |
|---|---|---|---|---|---|
| A | — | | | | |
| | | 1.000 | Air | | |
| B | −2053.907 | | | | |
| | | 9.025 | Schott LASFN30 | 1.807 | 46.13 |
| C | −24.212 | | | | |
| | | 3.046 | Schott LF6 | 1.570 | 42.56 |
| D | flat | | | | |
| | | 174.460 | Schott SF6 | 1.813 | 25.24 |
| E | flat | | | | |
| | | 3.046 | Schott LF6 | 1.570 | 42.56 |
| F | 24.212 | | | | |
| | | 9.025 | Schott LASFN30 | 1.807 | 46.13 |
| G | 2053.907 | | | | |
| | | 1.000 | Air | | |
| H | — | | | | |

| SURF | CONIC CONSTANT | AD | AE | AF | AG |
|---|---|---|---|---|---|
| B | 0.000E + 00 | −3.396E − 06 | −2.846E − 09 | −2.902E − 12 | 0.000E + 00 |
| G | 0.000E + 00 | 3.396E − 06 | 2.846E − 09 | 2.902E − 12 | 0.000E + 00 |

| BF | F/NBR | OID | T-MAG | REF OBJ HT | REF AP HT |
|---|---|---|---|---|---|
| 1.000 | 3.33 | 400 | −1.000 | 15.3 | 15.3 |

| WAVL NBR | 1 | 2 | 3 | 4 | 5 |
|---|---|---|---|---|---|
| WAVELENGTH | 0.5461 | 0.4800 | 0.6438 | 0.0000 | 0.0000 |
| SPECTRAL WT | 1.0000 | 1.0000 | 1.0000 | 1.0000 | 1.0000 |

APPENDIX 1L
(PETZVAL SUM = 1.32)

| SURFACE | RADIUS | THICKNESS | MEDIUM | INDEX | ABBE NO. |
|---|---|---|---|---|---|

APPENDIX 1L-continued (PETZVAL SUM = 1.32)

| | | | | | |
|---|---|---|---|---|---|
| A | — | | | | |
| | | 1.000 | Air | | |
| B | flat | | | | |
| | | 12.331 | Schott LAFN24 | 1.761 | 47.57 |
| C | −23.080 | | | | |
| | | 3.000 | Schott LF7 | 1.578 | 41.22 |
| D | 117.954 | | | | |
| | | 167.765 | Schott LAK10 | 1.723 | 50.17 |
| E | −117.954 | | | | |
| | | 3.000 | Schott LF7 | 1.578 | 41.22 |
| F | 23.081 | | | | |
| | | 12.331 | Schott LAFN24 | 1.761 | 47.57 |
| G | flat | | | | |
| | | 1.000 | Air | | |
| H | — | | | | |

| SURF | CONIC CONSTANT | AD | AE | AF | AG |
|---|---|---|---|---|---|
| C | −5.747E + 00 | 6.992E − 06 | 1.247E − 09 | 0.000E − 12 | 0.000E + 00 |
| F | −5.747E + 00 | −6.992E − 06 | −1.247E − 09 | 0.000E − 12 | 0.000E + 00 |

| BF | F/NBR | OID | T-MAG | REF OBJ HT | REF AP HT |
|---|---|---|---|---|---|
| 1.000 | 3.33 | 400 | −1.000 | 15.5 | 15.5 |

| WAVL NBR | 1 | 2 | 3 | 4 | 5 |
|---|---|---|---|---|---|
| WAVELENGTH | 0.5461 | 0.4800 | 0.6438 | 0.0000 | 0.0000 |
| SPECTRAL WT | 1.0000 | 1.0000 | 1.0000 | 1.0000 | 1.0000 |

APPENDIX 2

(PETZVAL SUM = 1.33)

| SURFACE | RADIUS | THICKNESS | MEDIUM | INDEX | ABBE NO. |
|---|---|---|---|---|---|
| A | flat | | | | |
| | | 14.312 | Schott LAFN24 | 1.761 | 47.57 |
| B | −23.358 | | | | |
| | | 3.000 | Schott LF7 | 1.578 | 41.22 |
| C | 102.675 | | | | |
| | | 165.773 | Schott LAK10 | 1.723 | 50.17 |
| D | −102.675 | | | | |
| | | 3.000 | Schott LF7 | 1.578 | 41.22 |
| E | 23.358 | | | | |
| | | 14.312 | Schott LAFN24 | 1.761 | 47.56 |
| F | — | | | | |

| SURF | CONIC CONSTANT | AD | AE | AF | AG |
|---|---|---|---|---|---|
| B | −5.748E + 00 | 6.755E − 06 | 1.104E − 09 | 0.000E − 12 | 0.000E + 00 |
| E | −5.748E + 00 | −6.755E − 06 | −1.104E − 09 | 0.000E − 12 | 0.000E + 00 |

| BF | F/NBR | OID | T-MAG | REF OBJ HT | REF AP HT |
|---|---|---|---|---|---|
| 0.000 | 3.33 | 400 | −1.000 | 15.16 | 15.16 |

| WAVL NBR | 1 | 2 | 3 | 4 | 5 |
|---|---|---|---|---|---|
| WAVELENGTH | 0.5461 | 0.4800 | 0.6438 | 0.0000 | 0.0000 |
| SPECTRAL WT | 1.0000 | 1.0000 | 1.0000 | 1.0000 | 1.0000 |

APPENDIX 3A (PETZVAL SUM = 1.19)

| SURFACE | RADIUS | THICKNESS | MEDIUM | INDEX | ABBE NO. |
|---|---|---|---|---|---|
| A | — | | | | |
| | | 1.000 | Air | | |
| B | −55947 | | | | |
| | | 10.692 | Schott LAFN28 | 1.777 | 49.33 |
| C | −24.770 | | | | |
| | | 177.057 | Schott LF6 | 1.570 | 42.56 |
| D | 24.770 | | | | |
| | | 10.692 | Schott LAFN28 | 1.777 | 49.33 |
| E | 55947 | | | | |
| | | 1.000 | Air | | |
| F | — | | | | |

| SURF | CONIC CONSTANT | AD | AE | AF | AG |
|---|---|---|---|---|---|
| B | 0.000E + 00 | −2.814E − 06 | −2.353E − 09 | −2.578E − 12 | 0.000E + 00 |
| E | 0.000E + 00 | 2.814E − 06 | 2.353E − 09 | 2.578E − 12 | 0.000E + 00 |

APPENDIX 3A-continued (PETZVAL SUM = 1.19)

| BF | F/NBR | OID | T-MAG | REF OBJ HT | REF AP HT |
|---|---|---|---|---|---|
| 1.000 | 3.57 | 400 | −1.000 | 16.27 | 16.27 |

| WAVL NBR | 1 | 2 | 3 | 4 | 5 |
|---|---|---|---|---|---|
| WAVELENGTH | 0.5461 | 0.4800 | 0.6438 | 0.0000 | 0.0000 |
| SPECTRAL WT | 1.0000 | 1.0000 | 1.0000 | 1.0000 | 1.0000 |

APPENDIX 3B (PETZVAL SUM = 1.18)

| SURFACE | RADIUS | THICKNESS | MEDIUM | INDEX | ABBE NO. |
|---|---|---|---|---|---|
| A | — | | | | |
| | | 1.000 | Air | | |
| B | Flat | | | | |
| | | 12.833 | Schott LASFN30 | 1.807 | 46.13 |
| C | −24.328 | | | | |
| | | 166.930 | Schott F8 | 1.599 | 38.91 |
| D | 24.328 | | | | |
| | | 12.833 | Schott LASFN30 | 1.807 | 46.13 |
| E | Flat | | | | |
| | | 1.000 | Air | | |
| H | — | | | | |

| SURF | CONIC CONSTANT | AD | AE | AF | AG |
|---|---|---|---|---|---|
| B | −6.183E + 01 | 5.836E − 06 | 5.973E − 09 | 0.00E − 12 | 0.000E + 00 |
| G | −6.183E + 01 | −5.836E − 06 | −5.973E − 09 | 0.00E − 00 | 0.000E + 00 |

| BF | F/NBR | OID | T-MAG | REF OBJ HT | REF AP HT |
|---|---|---|---|---|---|
| 1.000 | 3.33 | 400 | −1.000 | 16.80 | 16.80 |

| WAVL NBR | 1 | 2 | 3 | 4 | 5 |
|---|---|---|---|---|---|
| WAVELENGTH | 0.5461 | 0.4800 | 0.6438 | 0.0000 | 0.0000 |
| SPECTRAL WT | 1.0000 | 1.0000 | 1.0000 | 1.0000 | 1.0000 |

APPENDIX 3C (PETZVAL SUM = 1.19)

| SURFACE | RADIUS | THICKNESS | MEDIUM | INDEX | ABBE NO. |
|---|---|---|---|---|---|
| A | flat | | | | |
| | | 14.597 | Schott LASFN320 | 1.807 | 46.13 |
| B | −24.138 | | | | |
| | | 171.710 | Schott F8 | 1.599 | 38.91 |
| C | 24.138 | | | | |
| | | 14.597 | Schott LASFN30 | 1.807 | 46.13 |
| D | flat | | | | |

| SURF | CONIC CONSTANT | AD | AE | AF | AG |
|---|---|---|---|---|---|
| B | −6.450E + 00 | 5.718E − 06 | 4.678E − 10 | 0.000E − 00 | 0.000E + 00 |
| C | −6.450E + 00 | −5.718E − 06 | −4.678E − 10 | 0.000E − 00 | 0.000E + 00 |

| BF | F/NBR | OID | T-MAG | REF OBJ HT | REF AP HT |
|---|---|---|---|---|---|
| 0.000 | 3.33 | 400 | −1.000 | 16.52 | 16.52 |

| WAVL NBR | 1 | 2 | 3 | 4 | 5 |
|---|---|---|---|---|---|
| WAVELENGTH | 0.5461 | 0.4800 | 0.6438 | 0.0000 | 0.0000 |
| SPECTRAL WT | 1.0000 | 1.0000 | 1.0000 | 1.0000 | 1.0000 |

APPENDIX 4

(PETZVAL SUM = −0.28)

| SURFACE | RADIUS | THICKNESS | MEDIUM | INDEX | ABBE NO. |
|---|---|---|---|---|---|
| A | — | | | | |
| | | 0.600 | Air | | |
| B | 142.090 | | | | |
| | | 142.090 | Schott LASFN31 | 1.886 | 40.76 |
| C | −27.780 | | | | |
| | | 2.874 | Schott TIFN5 | 1.598 | 35.24 |
| D | 50.246 | | | | |
| | | 181.032 | Air | | |
| E | −50.246 | | | | |
| | | 2.874 | Schott TIFN5 | 1.598 | 35.24 |

APPENDIX 4-continued (PETZVAL SUM = −0.28)

| | | | | | |
|---|---|---|---|---|---|
| F | 27.780 | | | | |
| | | 6.000 | Schott LASFN31 | 1.886 | 35.24 |
| G | −142.090 | | | | |
| | | 0.600 | Air | | |
| H | — | | | | |

| SURF | CONIC CONSTANT | AD | AE | AF | AG |
|---|---|---|---|---|---|
| B | 0.000E + 00 | −3.395E − 06 | −2.392E − 09 | −1.628E − 12 | 0.000E + 00 |
| G | 0.000E + 00 | 3.395E − 06 | 2.392E − 09 | 1.628E − 12 | 0.000E + 00 |

| BF | F/NBR | OID | T-MAG | REF OBJ HT | REF AP HT |
|---|---|---|---|---|---|
| 0.600 | 7.14 | 399.958 | −1.000 | 14.53 | 14.53 |

| WAVL NBR | 1 | 2 | 3 | 4 | 5 |
|---|---|---|---|---|---|
| WAVELENGTH | 0.5461 | 0.4800 | 0.6438 | 0.0000 | 0.0000 |
| SPECTRAL WT | 1.0000 | 1.0000 | 1.0000 | 1.0000 | 1.0000 |

What is claimed is:

1. A lens assembly for incorporation into an optical transfer system wherein two such assemblies define an optical transfer module for transferring an image between successive image planes, the lens assembly comprising:

a substantially symmetric rod-like central element constructed of a first material having a relatively high index of refraction and having first and second surfaces;

first and second substantially identical negative elements constructed of a second material having a relatively low index of refraction, being axially spaced apart from each other by said central element and being cemented to said central element; and first and second substantially identical positive elements constructed of a third material having a relatively high index of refraction, being spaced apart from each other by said central element and said negative elements and being cemented to said negative elements;

the lens assembly thus being characterized by a first pair of optical surfaces at the ends thereof, a second pair of optical surfaces at the interfaces between said first positive and first negative elements and between said second positive and second negative elements, and a third pair of optical surfaces between said negative elements and said central element, at least one of said pairs of optical surfaces being aspheric to substantially correct spherical aberration;

the dispersions of said first, second, and third materials being chosen to substantially correct chromatic aberration;

the index difference contribution to the Petzval sum dominating the bending and spacing contribution to the Petzval sum contribution.

2. The lens assembly of claim 1 wherein said central element has convex surfaces, said negative elements are concave-concave, and said positive elements are concave-convex.

3. The lens assembly of claim 1 wherein said central element and said positive elements are formed of the same material.

4. The lens assembly of claim 1 wherein said central elements and said positive elements are formed of different materials.

5. A lens assembly for incorporation into an optical transfer system, the lens assembly comprising:

a substantially symmetric rod-like central element constructed of a first material having a relatively high index of refraction and having first and second surfaces;

first and second substantially identical negative elements constructed of a second material having a relatively low index of refraction, being axially spaced apart from each other by said central element and being cemented to said central element; and first and second substantially identical positive elements constructed of a third material having a relatively high index of refraction, being spaced apart from each other by said central element and said negative elements and being cemented to said negative elements;

the lens assembly thus being characterized by a first pair of optical surfaces at the ends thereof, said first pair of optical surfaces being flat, a second pair of optical surfaces at the interfaces between said first positive and first negative elements and between said second positive and second negative elements, and a third pair of optical surfaces between said negative elements and said central element, at least one of said second and third pairs of optical surfaces being aspheric to substantially correct spherical aberration;

the dispersions of said first, second, and third materials being chosen to substantially correct chromatic aberration;

the index difference contribution to the Petzval sum dominating the bending and spacing contributions to the Petzval sum contribution;

wherein the lens assembly, when incorporated into the optical system with another such lens assembly, cooperates with the other lens assembly so that the two lens assemblies define on optical transfer module that transfers an image between successive first and second imager planes and define a pupil plane between said image planes, and wherein the lens assembly has one of its first pair of optical surfaces lying in one of said image planes and the other of its first pair of optical surfaces lying in said pupil plane;

whereby adjacent lens assemblies, when incorporated into the optical system, can be cemented to each other or have their adjacent positive elements formed as a unitary element.

6. A lens assembly for incorporation into an optical transfer system, the lens assembly comprising:
a substantially symmetric rod-like central element constructed of a first material having a relatively low index of refraction and having first and second concave aspheric surfaces; and
first and second substantially identical positive elements constructed of a second material having a relatively high index of refraction, each being formed with a flat surface and a convex aspheric surface, said positive elements being spaced apart from each other by said central element and being cemented to said central elements;

and second image planes and define a pupil plane between said image planes, and wherein the lens assembly has one of said flat surfaces lying in one of said image planes and the other of said flat surfaces lying in said pupil plane;
whereby adjacent lens assemblies, when incorporated into the optical system, can be cemented to each other or have their adjacent positive elements formed as a unitary element.

7. A five-element lens assembly for incorporation into an optical transfer system wherein two such assemblies define an optical transfer module for transferring an image between successive image planes, the lens assembly having normalized geometrical parameters and being made of optical materials as follows:

| SURFACE | RADIUS | THICKNESS | MEDIUM | INDEX | ABBE NO. |
|---|---|---|---|---|---|
| A | image/pupil plane | | | | |
| | | 2.000 | Air | | |
| B | −65.414 | | | | |
| | | 11.211 | Schott LAF241 | 1.792 | 47.23 |
| C | −15.949 | | | | |
| | | 3.000 | Schott LF7 | 1.578 | 41.22 |
| D | 28.884 | | | | |
| | | 167.568 | Schott LAF25 | 1.789 | 41.04 |
| E | −28.884 | | | | |
| | | 3.000 | Schott LF7 | 1.579 | 41.22 |
| F | 15.949 | | | | |
| | | 11.211 | Schott LAF21 | 1.792 | 47.23 |
| G | 65.414 | | | | |
| | | 2.000 | Air | | |
| H | pupil/image plane | | | | |

| SURF | CONIC CONSTANT | AD | AE | AF | AG |
|---|---|---|---|---|---|
| B | 1.687E + 01 | −2.983E − 06 | −4.188E − 09 | −7.958E − 12 | 0.000E + 00 |
| G | 1.687E + 01 | 2.983E − 06 | 4.188E − 09 | 7.958E − 12 | 0.000E + 00 | the dispersions of said first and second materials being chosen to substantially correct chromatic aberration;
the index difference contribution to the Petzval sum dominating the bending and spacing contribution to the Petzval sum contribution;

8. A five-element lens assembly for incorporation into an optical transfer system wherein two such assemblies define an optical transfer module for transferring an image between successive image planes, the lens assembly having normalized geometrical parameters and being made of optical materials as follows:

| SURFACE | RADIUS | THICKNESS | MEDIUM | INDEX | ABBE NO. |
|---|---|---|---|---|---|
| A | image/pupil plane | | | | |
| | | 1.000 | Air | | |
| B | −117.681 | | | | |
| | | 14.879 | Schott LASFN30 | 1.807 | 46.13 |
| C | −22.026 | | | | |
| | | 3.000 | Schott LF7 | 1.578 | 41.22 |
| D | 37.521 | | | | |
| | | 162.605 | Schott LAF2 | 11.792 | 47.23 |
| E | −37.521 | | | | |
| | | 3.000 | Schott LF7 | 1.578 | 41.22 |
| F | 22.026 | | | | |
| | | 14.879 | Schott LASFN30 | 1.807 | |
| G | 117.681 | | | | |
| | | 1.000 | Air | | |
| H | pupil/image plane | | | | |

| SURF | CONIC CONSTANT | AD | AE | AF | AG |
|---|---|---|---|---|---|
| B | 2.453E + 01 | −2.427E − 06 | −2.820E − 09 | −4.759E − 12 | 0.000E + 00 |
| G | 2.453E + 01 | 2.427E − 06 | 2.820E − 09 | 4.759E − 12 | 0.000E + 00 | wherein the lens assembly, when incorporated into the optical system with another such lens assembly, cooperates with the other lens assembly so that the two lens assemblies define an optical transfer module that transfers an image between successive first 9. A five-element lens assembly for incorporation into an optical transfer system wherein two such assemblies define an optical transfer module for transferring an image between successive image planes, the lens assembly having normalized geometrical parameters and assembly having normalized geometrical parameters and being made of optical materials as follows:

| SURFACE | RADIUS | THICKNESS | MEDIUM | INDEX | ABBE NO. |
|---|---|---|---|---|---|
| A | image/pupil plane | | | | |
| | | 1.000 | Air | | |
| B | 885.300 | | | | |
| | | 9.615 | Schott LAFN24 | 1.761 | 47.57 |
| C | −25.732 | | | | |
| | | 3.000 | Schott LLF1 | 1.551 | 45.47 |
| D | 31.395 | | | | |
| | | 173.016 | Schott BK7 | 1.519 | 63.96 |
| E | −31.395 | | | | |
| | | 3.000 | Schott LLF1 | 1.551 | 45.47 |
| F | 25.732 | | | | |
| | | 9.615 | Schott LAFN24 | 1.761 | 47.57 |
| G | −885.300 | | | | |
| | | 1.000 | Air | | |
| H | pupil/image plane | | | | |

| SURF | CONIC CONSTANT | AD | AE | AF | AG |
|---|---|---|---|---|---|
| B | 0.000E + 00 | −2.648E − 06 | −2.041E − 09 | −1.831E − 12 | 0.000E + 00 |
| G | 0.000E + 00 | 2.648E − 06 | 2.041E − 09 | 1.831E − 12 | 0.000E + 00 | being made of optical materials as follows:

| SURFACE | RADIUS | THICKNESS | MEDIUM | INDEX | ABBE NO. |
|---|---|---|---|---|---|
| A | image/pupil plane | | | | |
| | | 2.000 | Air | | |
| B | −125.497 | | | | |
| | | 15.740 | Schott LASF3 | 1.813 | 40.36 |
| C | −22.623 | | | | |
| | | 4.000 | Polycarbonate | 1.590 | 29.62 |
| D | 43.034 | | | | |
| | | 157.900 | Schott SF57 | 1.855 | 23.64 |
| E | −43.034 | | | | |
| | | 4.000 | Polycarbonate | 1.590 | 29.62 |
| F | 22.623 | | | | |
| | | 15.740 | Schott LASF3 | 1.813 | 40.36 |
| G | 125.497 | | | | |
| | | 2.000 | Air | | |
| H | pupil/image plane | | | | |

| SURF | CONIC CONSTANT | AD | AE | AF | AG |
|---|---|---|---|---|---|
| B | 3.323E + 01 | −1.722 E− 06 | −1.307E − 09 | −1.208E − 12 | 0.000E + 00 |
| G | 3.323E + 01 | 2.722 E− 06 | 1.307E − 09 | 1.208E − 12 | 0.000E + 00 |

10. A five-element lens assembly for incorporation into an optical transfer system wherein two such assemblies define an optical transfer module for transferring an image between successive image planes, the lens assembly having normalized geometrical parameters and being made of optical materials as follows:

11. A five-element lens assembly for incorporation into an optical transfer system wherein two such assemblies define an optical transfer module for transferring an image between successive image planes, the lens assembly having normalized geometrical parameters and being made of optical materials as follows:

| SURFACE | RADIUS | THICKNESS | MEDIUM | INDEX | ABBE NO. |
|---|---|---|---|---|---|
| A | image/pupil plane | | | | |
| | | 1.000 | Air | | |
| B | −2053.907 | | | | |
| | | 9.025 | Schott LASFN30 | 1.807 | 46.13 |
| C | −24.212 | | | | |
| | | 3.046 | Schott LF6 | 1.570 | 42.56 |
| D | Flat | | | | |
| | | 174.460 | Schott SF6 | 1.813 | 25.24 |
| E | Flat | | | | |
| | | 3.046 | Schott LF6 | 1.570 | 42.56 |
| F | 24.212 | | | | |
| | | 9.025 | Schott LASFN30 | 1.807 | 46.13 |
| G | 2053.907 | | | | |
| | | 1.000 | Air | | |
| H | pupil/image plane | | | | |

| SURF | CONIC CONSTANT | AD | AE | AF | AG |
|---|---|---|---|---|---|

-continued

| | | | | | |
|---|---|---|---|---|---|
| B | 0.000E + 00 | −3.396E − 06 | −2.846E − 09 | −2.902E − 12 | 0.000E + 00 |
| G | 0.000E + 00 | 3.396E − 06 | 2.846E − 09 | 2.902E − 12 | 0.000E + 00 |

12. A five-element lens assembly for incorporation into an optical transfer system wherein two such assemblies define an optical transfer module for transferring an image between successive image planes, the lens assembly having normalized geometrical parameters and being made of optical materials as follows:

| SURFACE | RADIUS | THICKNESS | MEDIUM | INDEX | ABBE NO. |
|---|---|---|---|---|---|
| A | flat | | | | |
| | | 14.312 | Schott LAFN24 | 1.761 | 47.57 |
| B | −23.358 | | | | |
| | | 3.000 | Schott LF7 | 1.578 | 41.22 |
| C | 102.675 | | | | |
| | | 165.773 | Schott LAK10 | 1.723 | 50.17 |
| D | −102.675 | | | | |
| | | 3.000 | Schott LF7 | 1.578 | 41.22 |
| E | 23.358 | | | | |
| | | 14.312 | Schott LAFN24 | 1.761 | 47.56 |
| F | flat | | | | |

| SURF | CONIC CONSTANT | AD | AE | AF | AG |
|---|---|---|---|---|---|
| B | −5.748E + 00 | 6.755E − 06 | 1.104E − 09 | 0.000E − 00 | 0.000E + 00 |
| E | −5.748E + 00 | −6.755E − 06 | −1.104E − 09 | 0.000E − 00 | 0.000E + 00 |

13. A lens assembly for incorporation into an optical transfer system wherein two such assemblies define an optical transfer module for transferring an image between successive image planes, the lens assembly having normalized geometrical parameters and being made of optical material as follows:

| SURFACE | RADIUS | THICKNESS | MEDIUM | INDEX | ABBE NO. |
|---|---|---|---|---|---|
| A | image/pupil plane | | | | |
| | | 1.000 | Air | | |
| B | Flat | | | | |
| | | 12.331 | Schott LAFN24 | 1.761 | 47.57 |
| C | −23.080 | | | | |
| | | 3.000 | Schott LF7 | 1.578 | 41.22 |
| D | 117.954 | | | | |
| | | 167.765 | Schott LAK10 | 1.723 | 50.17 |
| E | −117.954 | | | | |
| | | 3.000 | Schott LF7 | 1.578 | 41.22 |
| F | 23.081 | | | | |
| | | 12.331 | Schott LAFN24 | 1.761 | 47.57 |
| G | Flat | | | | |
| | | 1.000 | Air | | |
| H | pupil/image plane | | | | |

| SURF | CONIC CONSTANT | AD | AE | AF | AG |
|---|---|---|---|---|---|
| C | −5.747E + 00 | 6.992E − 06 | 1.247E − 09 | 0.000E − 12 | 0.000E + 00 |
| F | −5.747E + 00 | −6.992E − 06 | −1.247E − 09 | 0.000E − 12 | 0.000E + 00 |

14. A triplet lens assembly for incorporation into an optical transfer system wherein two such assemblies define an optical transfer module for transferring an image between successive image planes, the lens assembly having normalized geometrical parameters and being made of optical materials as follows:

| SURFACE | RADIUS | THICKNESS | MEDIUM | INDEX | ABBE NO. |
|---|---|---|---|---|---|
| A | image/pupil plane | | | | |
| | | 1.000 | Air | | |
| B | −55947 | | | | |
| | | 10.692 | Schott LAFN28 | 1.777 | 49.33 |
| C | −24.770 | | | | |
| | | 177.057 | Schott LF6 | 1.570 | 42.56 |
| D | 24.770 | | | | |
| | | 10.692 | Schott LAFN28 | 1.777 | 49.33 |
| E | 55947 | | | | |
| | | 1.000 | Air | | |
| F | pupil/image plane | | | | |

| SURF | CONIC CONSTANT | AD | AE | AF | AG |
|---|---|---|---|---|---|
| B | 0.000E + 00 | −2.814E − 06 | −2.353E − 09 | −2.578E − 12 | 0.000E + 00 |

-continued

| | | | | | |
|---|---|---|---|---|---|
| E | 0.000E + 00 | 2.814E − 06 | 2.353E − 09 | 2.578E − 00 | 0.000E + 00 |

15. A triplet lens assembly for incorporation into an optical transfer system wherein two such assemblies define an optical transfer module for transferring an image between successive image planes, the lens assembly having normalized geometrical parameters and being made of optical materials as follows:

| SURFACE | RADIUS | THICKNESS | MEDIUM | INDEX | ABBE NO. |
|---|---|---|---|---|---|
| A | flat | | | | |
| | | 14.597 | Schott LASFN320 | 1.807 | 46.13 |
| B | −24.138 | | | | |
| | | 171.701 | Schott F8 | 1.599 | 38.91 |
| C | 24.138 | | | | |
| | | 14.597 | Schott LASFN30 | 1.807 | 46.13 |
| D | flat | | | | |

| SURF | CONIC CONSTANT | AD | AE | AF | AG |
|---|---|---|---|---|---|
| B | −6.450E + 01 | 5.718E − 06 | 4.678E − 10 | 0.000E − 00 | 0.000E + 00 |
| C | −6.450E + 01 | −5.718E − 06 | −4.678E − 10 | 0.000E − 00 | 0.000E + 00 |

16. A lens assembly for incorporation into an optical transfer system wherein two such assemblies define an optical transfer module for transferring an image between successive image planes, the lens assembly having normalized geometrical parameters and being made of optical materials as follows:

| SURFACE | RADIUS | THICKNESS | MEDIUM | INDEX | ABBE NO. |
|---|---|---|---|---|---|
| A | image/pupil plane | | | | |
| | | 1.000 | Air | | |
| B | Flat | | | | |
| | | 12.833 | Schott LASFN30 | 1.807 | 46.13 |
| C | −24.328 | | | | |
| | | 166.930 | Schott F8 | 1.599 | 38.91 |
| D | 24.328 | | | | |
| | | 12.833 | Schott LASFN30 | 1.807 | 46.13 |
| E | Flat | | | | |
| | | 1.000 | Air | | |
| F | pupil/image plane | | | | |

| SURF | CONIC CONSTANT | AD | AE | AF | AG |
|---|---|---|---|---|---|
| C | −6.183E + 01 | 5.836E − 06 | 5.973E − 10 | 0.00E − 12 | 0.000E + 00 |
| D | −6.183E + 01 | −5.836E − 06 | −5.973E − 10 | 0.00E − 00 | 0.000E + 00 |

17. A pair of doublet lens assemblies for incorporation into an optical transfer system wherein two such pairs of doublet lens assemblies define an optical transfer module for transferring an image between successive image planes, the pair of doublet lens assemblies having normalized geometrical parameters and being made of optical materials as follows:

| SURFACE | RADIUS | THICKNESS | MEDIUM | INDEX | ABBE NO. |
|---|---|---|---|---|---|
| A | image/pupil plane | | | | |
| | | 0.600 | Air | | |
| B | 142.090 | | | | |
| | | 6.000 | Schott LASFN31 | 1.886 | 40.76 |
| C | −27.780 | | | | |
| | | 2.874 | Schott TIFN5 | 1.598 | 35.24 |
| D | 50.246 | | | | |
| | | 181.032 | Air | | |
| E | −50.246 | | | | |
| | | 2.874 | Schott TIFN5 | 1.598 | 35.24 |
| F | 27.780 | | | | |
| | | 6.000 | Schott LASFN31 | 1.886 | 35.24 |
| G | −142.090 | | | | |
| | | 0.600 | Air | | |
| H | pupil/image plane | | | | |

| SURF | CONIC CONSTANT | AD | AE | AF | AG |
|---|---|---|---|---|---|
| B | 0.000E + 00 | −3.395E − 06 | −2.392E − 09 | −1.628E − 12 | 0.000E + 00 |
| G | 0.000E + 00 | 3.395E − 06 | 2.392E − 09 | 1.628E − 12 | 0.000E + 00 |

18. A lens assembly for incorporation into an optical transfer system, the lens assembly comprising:
- a substantially symmetric rod-like central element constructed of a first material having a relatively high index of refraction and having first and second surfaces;
- first and second substantially identical negative elements constructed of a second material having a relatively low index of refraction, being axially spaced apart from each other by said central element and being cemented to said central element; and
- first and second substantially identical positive elements constructed of a third material having a relatively high index of refraction, being spaced apart from each other by said central elements and said negative elements and being cemented to said negative elements;
- the lens assembly thus being characterized by a first pair of optical surfaces at the ends thereof, said first pair of optical surfaces being flat, a second pair of optical surfaces at the interfaces between said first positive and first negative elements and between said second positive and second negative elements, and a third pair of optical surfaces between said negative elements and said central element, at least one of said second and third pairs of optical surfaces being aspheric to substantially correct spherical aberration;
- the dispersions of said first, second, and third materials being chosen to substantially correct chromatic aberration;
- the index difference contribution to the Petzval sum dominating the bending and spacing contributions to the Petzval sum contribution.

19. A lens assembly for incorporation into an optical transfer system, the lens assembly comprising:
- a substantially symmetric rod-like central element constructed of a first material having a relatively low index of refraction and having first and second concave aspheric surfaces; and
- first and second substantially identical positive elements constructed of a second material having a relatively high index of refraction, each being formed with a flat surface and a convex aspheric surface, said positive elements being spaced apart from each other by said central element and being cemented to said central elements;
- the dispersions of said first and second materials being chosen to substantially correct chromatic aberration;
- the index difference contribution to the Petzval sum dominating the bending and spacing contributions to the Petzval sum contribution.

* * * * *